Aug. 1, 1961 M. M. ASTRAHAN 2,994,853

INFORMATION RECORD READING SYSTEM

Filed July 7, 1958 2 Sheets-Sheet 1

INVENTOR.
MORTON M. ASTRAHAN

BY [signature]

ATTORNEY

Aug. 1, 1961 M. M. ASTRAHAN 2,994,853

INFORMATION RECORD READING SYSTEM

Filed July 7, 1958 2 Sheets-Sheet 2

INVENTOR.
MORTON M. ASTRAHAN
BY [signature]
ATTORNEY

United States Patent Office 2,994,853

Patented Aug. 1, 1961

2,994,853

INFORMATION RECORD READING SYSTEM

Morton M. Astrahan, San Jose, Calif., assignor to International Business Machines Corporation, New York, N.Y., a corporation of New York Filed July 7, 1958, Ser. No. 746,884
10 Claims. (Cl. 340—173)

This invention relates to a system for the recovery of digital information from a record track and more particularly to a system for deriving electrical signals representing digital information from a record track in which the digital information is recorded in a mark-space code.

Where data processing and digital computer systems are employed to perform manipulations, operations and computations of digital information, it is necessary to provide an input device for translating the information from its original form to a coded form for entry into the system. For example, by means of a manual keyboard, electrical connections may be made by an operator to generate electrical signals which represent digital information in binary coded form. However, where a large quantity of digital information is to be entered in the system, the dependence of known input devices, such as keyboards, on the skill of the operator is a limitation on the speed and accuracy of the entry of the information.

The problem of entering information in a data processing or digital computer system is particularly acute where the information appears on a large number of separate documents which must be individually handled to secure the desired information. Generally, existing systems for the direct reading of coded documents require expensive and complicated means for accurately aligning a reading instrument with the coded region of the document during a reading operation. In addition, the reading instrument generally must be swept across the coded document at a constant velocity. Accordingly, there is a need for a new and improved system for deriving digital information from a record and generating suitably coded electrical signals acceptable to a data processing or digital computer system which does not require an accurate registration between a reading instrument and a coded document, and which does not require a constant scanning velocity between the document and the reading instrument.

Therefore, it is an object of the invention to provide an improved system for generating electrical signals corresponding to digital information stored in a specially prepared record track.

It is another object of the invention to provide a new and improved system for asynchronously deriving digital information which is identified by a timing signal from a single record track.

It is a further object of the invention to provide a new and improved system for entry of digital information in a data processing or digital computer system.

Briefly, in accordance with the invention, a system for the storage and recovery of binary digital information is provided in which a record track bears indicia representing information, a pair of spaced transducers are arranged to scan the record and generate electrical signals corresponding to the indicia, and both an output signal representing the recorded digital information and a timing signal identifying successive digital values are derived from the electrical signals generated by the transducers.

A better understanding of the invention may be had from a reading of the following detailed description and an inspection of the drawings, in which.

Figure 1:
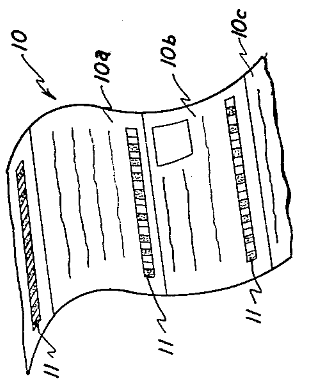
FIG. 1 is a diagrammatic illustration of a portion of a document having record tracks thereon in accordance with the invention.

FIG. 1 illustrates one way in which the present invention may be employed in the reading of digital information from specially prepared tracks on a document 10. The document 10 may comprise any conventional written record having a plurality of sections **10*a*–10*c* within which may be entered conventional printed, pictorial or handwritten information identifying the section, its contents or other matters relevant to the use intended. Across the bottom portion of each section of the document 10 there is arranged a special record track 11** including indicia representing digital information in a mark-space code.

Figure 2:
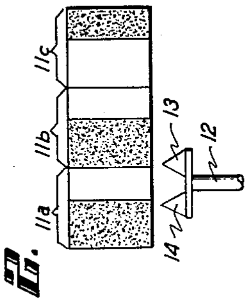
FIG. 2 is an enlarged representation of a portion of the record track shown in FIG. 1 along with a reading instrument.

FIG. 2 illustrates a portion of one such record track 11 enlarged to show the arrangement of the indicia in a mark-space binary code. In FIG. 2, three digital positions **11*a*, 11*b*, and 11*c* are shown representing respectively a binary "1," a binary "1," and a binary "0." Thus, reading from left to right, in digital positions 11*a* and 11*b* a mark precedes a space, while in the last digital position 11*c***, a space precedes a mark.

The indicia occurring in the mark-space code of the record tracks of FIGS. 1 and 2 may be sensed by passing a reading instrument 12 over the surface of the document on top of the selected record track 11. As shown diagrammatically in FIG. 2, the reading instrument 12 may comprise a pair of transducers 13 and 14 spaced apart by a distance equal to one-half of the length of one digital position. As the reading instrument 12 is swept along the record track 11, a first electrical signal train is derived representing the marks and spaces passing under the leading transducer 13 and a second electrical signal train is derived representing the marks and spaces passing under the following transducer 14.

It will be noted in FIG. 2 that the mark and space portions of each digital position are of unequal size. Thus, the first area, bt it mark or space, is wider than the second area of each digital position. However, the entire length of a digital position is equal to twice the spacing between the transducers 13 and 14, with the result that only one of the transducers 13 and 14 passes over a transition from a mark to a space or from a space to a mark at any given instant in time. Alternatively, the space and mark areas may be of equal size and the spacing between the transducers 13 and 14 may be made of the order to three-quarters of the length of a digital position. The important requirement is that the leading transducer 13 be in the middle of a mark or space in one digital position when the lagging transducer 14 is at the transition point in the previous digital position. Other spacings could be used to achieve a similar result with varying degrees of tolerance to rotational misalignment of the transducers 13 and 14 with the record track 11.

By comparing the signals derived from the transducers 13 and 14, there may be derived not only the binary value of the information in each successive digital position of the record track 11, but also a timing signal identifying the appearance of each digital value. A detailed description of the operation of the circuitry for effecting the comparison is given below in connection with FIGS. 4 and 5.

The mark-space coding of the record track 11 of FIGS. 1 and 2 may comprise any form of indicia capable of being sensed by the reading instrument 12. For example, the mark portions of each digital position may comprise magnetizable areas (high permeability) while the space portions may comprise non-magnetizable areas, in which case a pair of transducers similar to static magnetic reading heads may be employed in the reading instrument 12. Alternatively, the mark portions may comprise areas which have been blackened for light reflection while the space areas may comprise light reflective areas, in which case the transducers of the reading instrument 12 may comprise photocells or the like.

Figure 3:
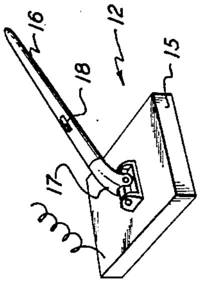
FIG. 3 is a perspective view of a reading instrument for use with the record tracks of FIGS. 1 and 2.

FIG. 3 illustrates one arrangement of a reading instrument 12 in accordance with the invention for use in manually scanning record tracks such as those of FIGS. 1 and 2. The instrument 12 includes a housing 15 which contains a pair of transducers spaced apart by a distance equal to one-half of the length of a digital position of the record track 11. A handle 16 is affixed to the housing 15 by a universal joint 17 so that the housing 15 and the transducers may be swept along a record track by grasping the handle 16 in the fashion of a pencil or pen. A switch 18 may be affixed to the handle 16 to close an electrical circuit to identify the start and finish of a message.

Figure 4:
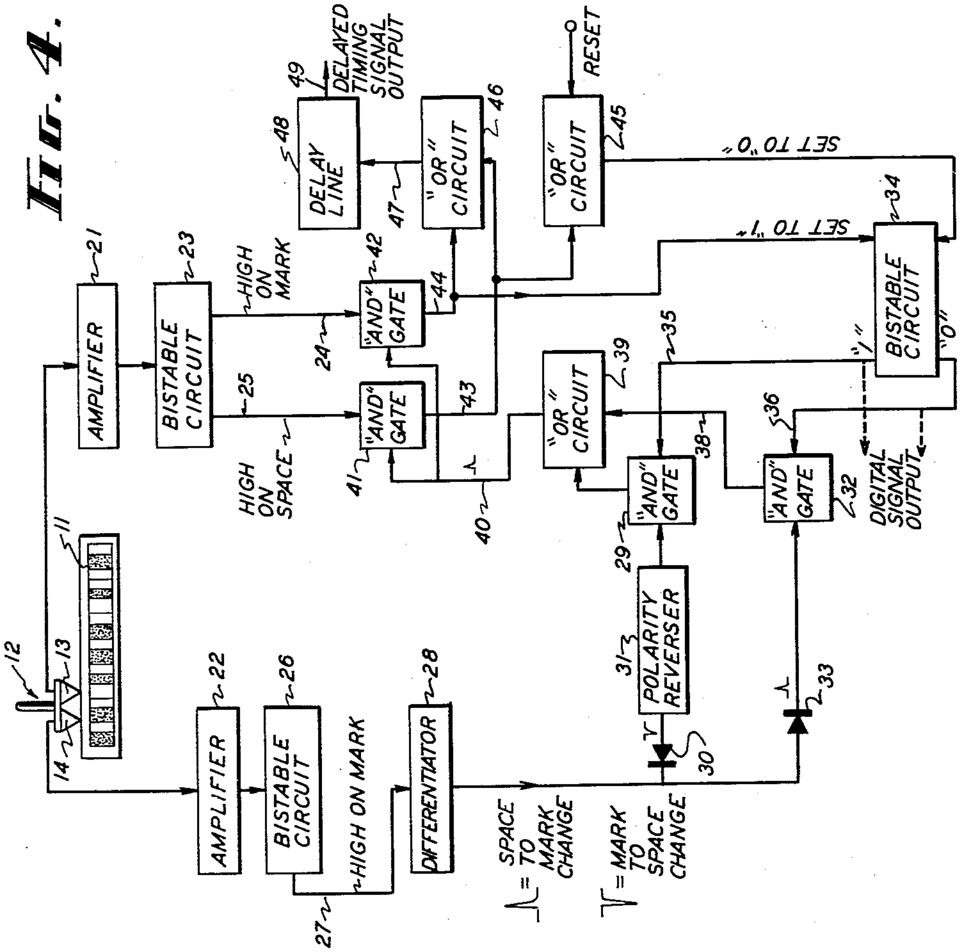
FIG. 4 is a block diagram of a system for deriving digital information from the record tracks of FIGS. 1 and 2 in accordance with the invention.

FIG. 4 illustrates a system for deriving information and timing signals from a record track 11 comprising a series of digital positions which are magnetically recorded in a mark-space binary code as described above. A reading instrument 12 may be swept along the record track 11 with a pair of spaced transducers 13 and 14 producing electrical signals representing the density of magnetizable material in each area along the record track 11.

Accordingly, a series of alternate high and low level signals are provided by the leading transducer 13 to be amplified by an amplifier 21. Similarly, the lagging transducer 14 produces a series of high and low level signals lagging the signals from the leading transducer 13 by an interval equal to the time required for the reading instrument 12 to be swept through a distance equal to the distance between transducers. The alternative high and low level signals supplied by the lagging transducer 14 are amplified by an amplifier 22.

The amplified signals from each of the amplifiers 21 and 22 are applied to separate bistable circuits 23 and 26, each of which may comprise a conventional Schmidt trigger circuit capable of assuming one stable condition of operation in response to a signal level higher than a critical value, and another stable condition of operation in response to a signal level lower than the critical value. At the output of the bistable circuit 23 a voltage is provided on a lead 24 having a high value during periods in which the leading transducer 13 is passing over an area representing a mark, while a low voltage appears on a lead 25. In contrast, when the leading transducer 13 is passing over a space area on the record track 11, the bistable circuit 23 is set to the condition in which a relatively low voltage appears on the lead 24 and a relatively high voltage appears on the lead 25. Thus, through the combined operation of the leading transducer 13, the amplifier 21 and the bistable circuit 23, out-of-phase signals on the leads 24 and 25 are produced representing the mark-space coding.

In a similar fashion, the alternate high and low level signals from the amplifier 22 function to set a bistable circuit 26 to a condition corresponding to the region of the record track 11 being traversed by the lagging transducer 14 with a resultant voltage appearing on the lead 27 having a high value when the lagging transducer 14 is traversing a mark area and a low value when the lagging transducer 14 is traversing a space area. Thus, each of the bistable circuits 23 and 26 is set to a condition corresponding to the mark-space indicia present on the record track 11, although the bistable circuit 26 associated with the lagging transducer 14 produces an output signal on the lead 27 which trails the output signals on the leads 24 and 25 of the bsitable circuit 23 associated with the leading transducer 13 by a time interval equal to the time required for the reading instrument 12 to pass along the record track the distance between transducers.

Figures 5, 6, 7, 8:
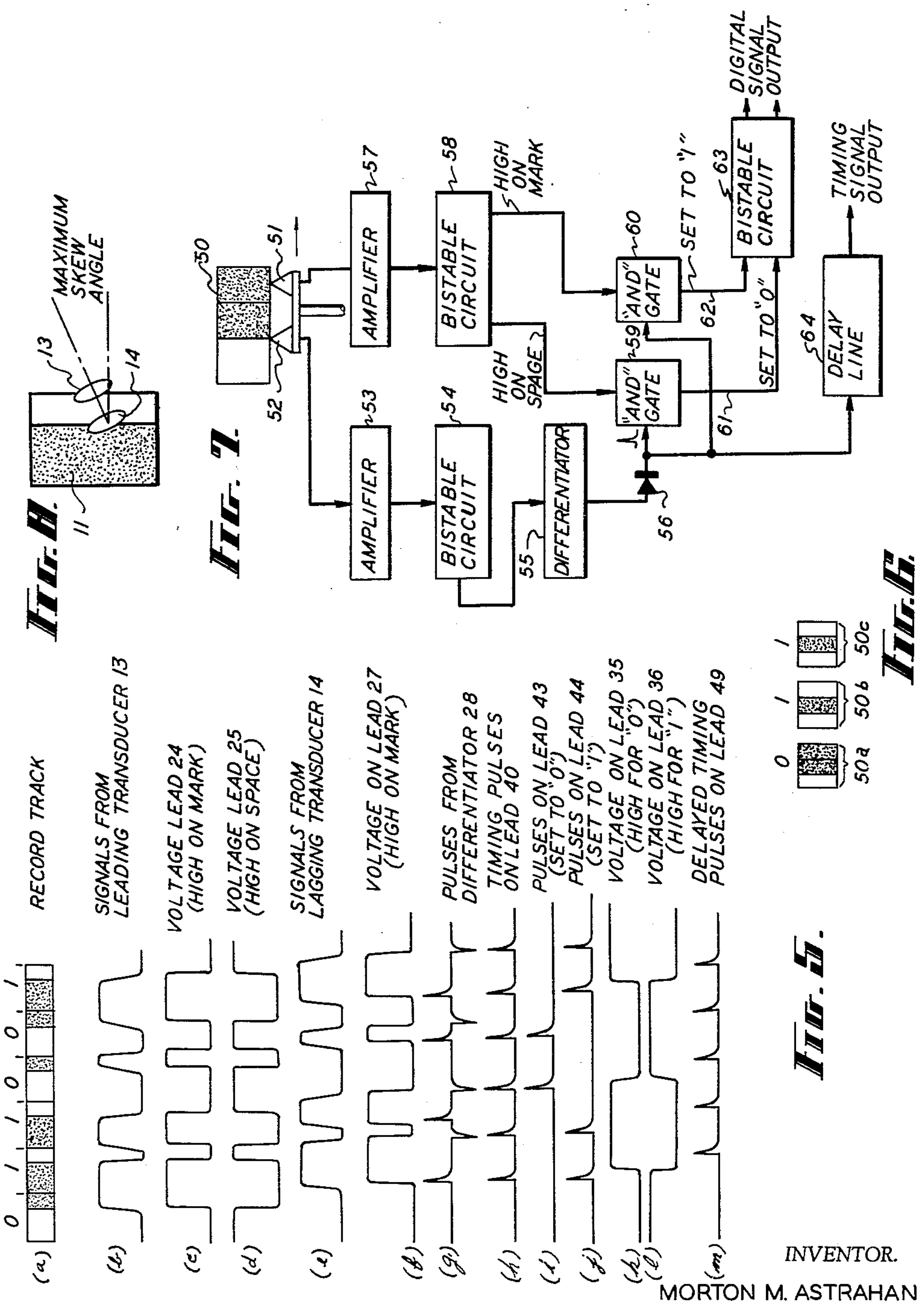
FIG. 5 is a set of graphical illustrations representing various electrical signals appearing in the system of FIG. 4.
FIG. 6 is an enlarged view of a portion of an alternative record track for use with the invention.
FIG. 7 is a block diagram of an alternative system for deriving digital information from the record track of FIG. 6 in accordance with the invention.
FIG. 8 is a diagrammatic representation of a reading instrument and a record track illustrating the maximum error-free permissible skew angle between a pair of transducers and the record track.

The relationship between the alternate high and low level signals derived from the leading and lagging transducers 13 and 14 and the resultant voltages appearing on the leads 24, 25 and 27 may be seen in FIG. 5, in which FIG. 5(*a*) represents the configuration of an exemplary record track, FIG. 5(*b*) represents the alternate high and low level signals derived from the leading transducer 13, FIG. 5(*c*) represents the resultant voltage appearing on the output lead 24 of the bistable circuit 23, FIG. 5(*d*) represents the voltage appearing on the output lead 25 of the bistable circuit 23, FIG. 5(*e*) represents the alternate high and low level signals derived from the lagging transducer 14, and FIG. 5(*f*) represents the voltage appearing on the output lead 27 from the bistable circuit 26. It should be noted that the graphical illustrations of FIG. 5 are plotted against the position of a leading transducer and not against time. Accordingly, the wave of FIG. 5(*e*) derived from the lagging transducer 14 trails the wave of FIG. 5(*b*) derived from the leading transducer 13 by the spacing between the pair of transducers.

By means of a differentiator 28, changes in the voltage appearing on the output lead 27 from the bistable circuit 26 are converted to alternate positive and negative going pulses. Negative going pulses only from the differentiator 28 are passed to an "AND" gate 29 via a diode 30 and a polarity reverser 31 which converts the negative going pulses to positive going pulses. Positive going pulses only from the differentiator 28 are passed to another "AND" gate 32 via a diode 33.

The "AND" gates 29 and 32 are connected to opposite sides of a bistable circuit 34 so that only one of the "AND" gates 29 and 32 is opened to pass pulses from the differentiator 28 at any given time. When the bistable circuit 34 is in one condition of operation a voltage appears on a lead 35 which opens the "AND" gate 29 to pass pulses representing mark-to-space changes, i.e. negative going pulses from the differentiator 28 only. However it will be appreciated that the actual pulses passed by the "AND" gate 29 are positive going due to the action of the polarity reverser 31. In contrast, when the bistable circuit 34 is in its other condition of operation, a voltage appears on the lead 36 which opens the "AND" gate 32 to pass pulses representing space-to-mark changes, i.e. positive going pulses from the differentiator 28 only.

The output leads 37 and 38 from the "AND" gates 29 and 32 are connected to an "OR" gate 39. Since the "OR" gate 39 passes all signals appearing on either the lead 37 or the lead 38 to an output lead 40, the signals appearing on the lead 40 correspond to whichever one one of the "AND" gates 29 and 32 is open at any given time. Since positive going pulses from the differentiator 28 represent space-mark transitions in the record track 11, and since negative going pulses from the differentiator 28 represent mark-space changes appearing in the record track 11, the bistable circuit 34 functions as a control to cause the "AND" gates 29 and 32 to search for and identify the next successive positive or negative going pulse from the differentiator 28 and hence, the next successive transition on the record track 11 from a space-to-mark or from a mark-to-space.

In overall operation the bistable circuit 34 is always caused to assume a state which opens the "AND" gates 29 and 32 to identify the pulse occurring at the transition in the middle of a digital position along the record track 11. This is accomplished by setting the bistable circuit 34 to a binary digital value corresponding to the digital position in the record track 11 being swept by the lagging transducer 14.

Where the binary digital value is "1," a mark-to-space transition occurs near the middle of the digital position producing a negative going pulse from the differentiator 28 and space-to-mark transitions are ignored so that the transition near the middle of the digital position is identified by the appearance of a pulse on the lead 40. On the other hand, where the binary digital value in the digital position is equal to "0," a space-to-mark transition occurs near the middle of the digital position and accordingly, the positive going pulse from the differentiator 28 is identified and passed to the lead 40.

By setting the bistable circuit 34 to a "0" binary value prior to the scanning of the record track, and by arranging the mark-space coding on the record track to commence always with a binary "0" value, the pulses appearing on the lead 40 may be employed to strobe the condition of the bistable circuit 23 associated with the leading transducer 13 to set the bistable circuit 34 to a condition representing the binary value of the coding in each successive digital position. In addition, the pulses appearing on the lead 40 may be employed as timing pulses to control the transfer of information from the bistable circuit 34 to auxiliary apparatus such as a stepping register or the like in a digital computer or data processing system as described in detail below.

The condition of the bistable circuit 23 associated with the leading transducer 13 controls the passage of the pulses from the lead 40 in such a way as to set the bistable circuit 34 to a condition representing the binary value of the digital position being scanned by the leading transducer 13 at the time at which a pulse derived from the lagging transducer 14 appears on the lead 40. For this purpose one of the "AND" gates 41 and 42 is enabled by the voltage appearing on the output leads 24 and 25 of the bistable circuit 23 to pass the pulse appearing on the lead 40. Thus, if the bistable circuit 23 indicates that the leading transducer 13 is scanning a space area, the pulse on the lead 40 is passed by the "AND" gate 41 to a lead 43. In contrast, where the bistable circuit 23 indicates that the leading transducer 13 is scanning a mark area on the record track 11, the pulse appearing on the lead 40 is passed by the "AND" gate 42 to a lead 44. The "AND" gate output leads 43 and 44 are connected to opposite sides respectively of the bistable circuit 34. In the case of the lead 43, the connection is made via an "OR" circuit 45 which is useful in resetting the bistable circuit 34 as described below. It is assumed that the response of the bistable circuit 34 to pulses on leads 43 and 44 is sufficiently slow so that the voltage on leads 35 and 36 which condition the "AND" gates 29 and 32 do not change enough to cut off the gate which was passing a pulse until the pulse has passed. This can be accomplished by inherent circuit delay or by specifically added delay. The bistable circuit 34 can thus control the source of a pulse which also changes the setting of the bistable circuit 34.

Accordingly, where the "AND" gate 41 passes the pulse from the lead 40, the bistable circuit 34 is set to a binary "0" value, and where the "AND" gate 42 passes the pulse from the lead 40, the bistable circuit 34 is set to a binary "1" value. Thus, in overall operation, the bistable circuit 34 is set in response to the timing pulse appearing at the lead 40 and assumes a binary value corresponding to the binary value of the digital position immediately beneath the leading transducer 13. Since the digital position immediately beneath the leading transducer 13 is the next successive digital position to be scanned by the lagging transducer 14, the bistable circuit 34 effects a proper control over the "AND" gates 29 and 32 to identify the centrally located transition from mark-to-space or from space-to-mark from which the strobing and timing pulse appearing on the lead 40 is derived as described in detail above.

By means of the "OR" circuit 45, pulses may be applied to the bistable circuit 34 to reset the bistable circuit 34 to a "0" binary value prior to the reading of a particular record track 11. In addition, the pulses appearing on the output leads 43 and 44 of both the "AND" gates 41 and 42 may be combined by means of an "OR" circuit 46 so that a pulse appears on a lead 47 coincident with the settling of the bistable circuit 34. A delay line 48 is connected serially with the lead 47 to allow the bistable circuit 34 to assume a stable condition of operation prior to the appearance of the timing pulses on the lead 49. By connecting a suitable output device such as a shift register (not shown) to the bistable circuit 34 as indicated by the dashed lines, and by employing the timing pulses from the lead 49 to gate the information from the bistable circuit 34 to the shift register, each successive binary digital value appearing in the bistable circuit 34 may be passed to a data processing system or digital computer.

The above described relationship between the condition of the bistable circuit 34, the pulses passed by the "AND" and "OR" gates 29, 32 and 39, and the pulses passed by the "AND" and "OR" gates 41, 42 and 46 for an exemplary record track may be seen from an inspection of the graphical illustration of FIG. 5 in which FIG. 5(*g*) represents the pulses from the differentiator 28, FIG. 5(*h*) represents the pulses on the lead 40, FIG. 5(*i*) represents the pulses appearing on the lead 43, FIG. 5(*j*) represents the pulses appearing on the lead 44, FIG. 5(*k*) represents the voltage on the lead 35, FIG. 5(*l*) represents the voltage on the lead 36, and FIG. 5(*m*) represents the delayed timing pulse appearing on the lead 49.

Since the timing signals appearing on the lead 49 identify each successive digital position on the record track 11, and the bistable circuit 34 is set to the binary digital value represented by the mark-space code in each successive digital position of the record track 11, the system of FIG. 4 affords an improved device for asynchronously reading digital information from a record for entry into a data processing system or digital computer.

FIG. 6 illustrates a portion of a record track 50 in which an alternative coding arrangement is employed for binary digital information. The coding arrangement of FIG. 6 includes in each digital position a mark-space indicia which precedes an area which may be either a mark or space to identify the binary digital value. Thus, in the first digital position 50 of FIG. 6, a binary "0" is represented by a space-mark-mark, and in the second and third digital positions 50*b* and 50*c* of FIG. 6, binary "1" values are represented by a space-mark-space.

The record track 50 may be swept by a pair of spaced transducers 51 and 52 similar to those of FIGS. 2–4. However, as illustrated in FIG. 7, the system for comparing the signals derived from the transducers may be simplified as compared to that of FIG. 4.

The spacing between the transducers 51 and 52 is such that whenever the lagging transducer 52 passes a space-mark transition, the leading transducer 51 is positioned in the area of the digital position representing the binary value. Accordingly, to derive a set of timing pulses, the signals from the lagging transducer 52 are amplified by an amplifier 53, applied to a level sensitive bistable circuit 54, and the output from the bistable circuit 54 is differentiated by a differentiator 55. Since only space-mark transitions are used as timing indicia, timing pulses may be derived from the differentiator 55 by means of a diode 56 which passes only positive going pulses representing space-mark transitions. In other respects, the arrangement of FIG. 7 is similar in construction and operation to the system of FIG. 4. Thus, the signals from the leading transducer 51 are amplified in the amplifier 57 and applied to a level sensitive bistable circuit 58, and a pair of "AND" gates 59 and 60 are enabled to pass the positive going pulses from the differentiator 55 to one or the other of a pair of leads 61 and 62 depending upon the condition of the bistable circuit 58 and hence, the binary value located beneath the leading transducer 51.

A bistable circuit 63 is set by the pulses on the leads 61 and 62 to represent the binary value in each successive digital position. Timing pulses for controlling the transfer of each successive binary value from the bistable circuit 63 may be derived from a delay line 64 connected to receive the positive going pulses passed by the diode 56.

A principal advantage of the three part coding system of FIGS. 6 and 7 is that the digital areas on the document need not be accurately registered with respect to each other. Therefore, with a three part code the apparatus for printing the coded indicia on the document may be simplified.

In the three part coding arrangement of FIGS. 6 and 7, the third part of each digital position representing the binary value may be adjusted in width to increase the tolerance of the system to misalignment of the transducers 51 and 52. Satisfactory misalignment tolerance can be achieved in either the system of FIG. 4 or the system of FIG. 7 by arranging the sensitive area of each transducer to be narrower than the narrowest part of a digital area and no higher than about twice the width of the narrowest part of a digital area.

For example, as shown in FIG. 8, when the two part coding of FIG. 2 is employed and a recording density of 16 bits per inch is utilized, the height of the digital areas must be sufficient to allow easy manual tracking of the record track 11 and the transducer sensitive area may be on the order of .040 inch x .010 inch. Under these conditions a two part code may consist of a digital area having a first part of .042 inch wide and a second part of .021 inch width, with the height of the area being .250 inch. These dimensions allow a maximum skew angle of about 20 degrees for transducers spaced .031 inch apart before the trailing edge of the leading transducer abuts the leading edge of the area when the lagging transducer just senses the mark-space change in the area.

Although the mark-space indicia of record tracks for use in accordance with the invention may be prepared by conventional magnetic ink or ordinary ink printing techniques, it is contemplated that documents having such a record track may also be prepared through the use of a typewriter equipped with suitable vertical type bars striking a ribbon impregnated with magnetic or regular ink.

Although two separate systems for utilizing the invention have been described above, it is intended that these be given by way of example only. Accordingly, the invention should be considered to encompass any alternative arrangements falling within the scope of the annexed claims.

What is claimed is:

1. An asynchronous information record reading system including the combination of a record track having a plurality of digital positions in each of which a binary digital value is represented by a mark-space code, a pair of spaced transducers adapted to be swept along the record track, means for deriving timing signals from one of the transducers corresponding to selected transitions in said mark-space code, and means for deriving information signals from the other of said transducers in response to each of said timing signals.

2. An information record reading system including the combination of a record track having a plurality of digital positions in each of which a binary value is represented by a mark-space code, a leading transducer, a lagging transducer spaced apart from said leading transducer by a distance less than the distance occupied by a single digital position on the record track, said leading and lagging transducers being adapted to be swept along the record track to generate electrical signals corresponding to the coding in each of the digital positions of the record track, means for deriving timing pulses from the electrical signals provided by the lagging transducer identifying selected transitions in the mark-space code on said record track, and means for sensing the binary digital value recorded in the digital position adjacent the leading transducer in response to each of said timing pulses.

3. An information record reading system including the combination of a record track having a plurality of digital positions in each of which a binary digital value is represented by a mark-space code, a reading instrument having leading and lagging transducers spaced apart by a distance less than the distance occupied by a digital position in the record track, said reading instrument being adapted to be swept along the record track from digital position to digital position, means connected to the lagging transducer for deriving a series of timing pulses corresponding to selected transitions in said mark-space code to identify each successive digital position, a bistable circuit connected to the leading transducer which is set to a condition representing the mark-space coding in each digital position passed by the leading transducer, and means connected to the bistable circuit for deriving an information signal representing the binary digital value of the digital position adjacent the leading transducer whenever a timing pulse appears.

4. An information record reading system including the combination of a record track having a plurality of successive digital positions in each of which a binary digital value is represented by a mark-space code, a leading transducer adapted to scan the record track to produce an electrical signal corresponding to the mark-space coding in each successive digital position, a lagging transducer adapted to be swept along the record track at a predetermined distance following the leading transducer to produce an electrical signal similar to the electrical signal produced by the leading transducer but delayed in time by an interval equal to the time required for relative movement between the record track and the reading instrument equal to the predetermined distance between the leading and lagging transducers, a timing pulse separating circuit connected to the lagging transducer for generating a series of timing pulses corresponding to selected transitions in said mark-space code to identify each successive digital position, and means connected between the timing pulse separating circuit and the leading transducer for generating an output signal corresponding to the binary digital value of the digital position adjacent the leading transducer at the time each timing pulse appears.

5. An information record reading system including the combination of a record track having a plurality of digital positions in each of which a centrally located transition occurs in a mark-space code representing a binary digital value, a pair of transducers spaced apart by a distance less than the length of a digital position in the record track, one of said transducers being adapted to be swept along the record track to produce a first electrical signal representing the mark-space code contained in each successive digital position, a second one of said pair of transducers being adapted to generate a second electrical signal similar to the first electrical signal but delayed in time by an interval equal to the time required for the pair of transducers to be swept along the record track a distance equal to the spacing between the transducers, a pulse separating circuit connected to the second one of the transducers to derive timing pulses from the second electrical signal corresponding to the centrally located transition in each successive digital position, a bistable circuit connected to the first of the transducers which is set to a condition corresponding to the mark-space code by the first electrical signal from the first transducer, and means connected between the pulse separating circuit and the bistable circuit for generating an output signal having a binary value corresponding to the mark-space coding in the digital position adjacent the first transducer whenever a timing pulse appears.

6. An information record reading system including the combination of a record track having a plurality of successive digital positions each of which includes a mark-space code representing a binary digital value, a leading transducer, a lagging transducer spaced apart from the leading transducer by a distance less than the length of a digital position on the record track, means for producing relative movement between the record track and the pair of transducers, a pair of gates, means connected between the leading transducer and the pair of gates for alternately opening the gates in accordance with the appearance of the mark-space coding along the record track, a timing pulse generating circuit connected to the lagging transducer for generating a pulse identifying transitions in the mark-space coding occurring in centrally located positions in each successive digital position along the record track, said timing pulse generating circuit being connected to the gates so that the timing pulse is passed by a selected one of the gates in accordance with the coding adjacent the leading transducer, and a bistable output circuit connected to the gates so as to be set to a condition representing the binary value of each successive digital position along the record track.

7. An information record reading system in accordance with claim 6 in which said timing pulse generating circuit includes a pair of gates connected to the bistable output circuit for identifying and passing pulses representing the centrally located mark-space transition appearing in each digital position only.

8. An information record reading system including the combination of a record track having a plurality of digital positions in each of which a binary value is represented by a mark-space code, a leading transducer, a lagging transducer spaced apart from said leading transducer by a distance less than the distance occupied by a single digital position on the record track, said leading and lagging transducers being adapted to be swept along the record track to generate output signals corresponding to the coding in each of the digital positions of the record track, means for comparing the output signals from said leading and lagging transducers for deriving a timing pulse from the electrical signals provided by the lagging transducer for each successive digital position, and means for comparing the timing pulses derived from the lagging transducer with the electrical signals provided by the leading transducer to sense the binary digital value recorded in the digital position adjacent the leading transducer in response to each of said timing pulses.

9. An information record reading system including the combination of a record track having a plurality of digital positions in each of which a transition occurs in a mark-space code representing a binary digital value, a pair of transducers spaced apart by a distance less than the length of a digital position in the record track and adapted to be swept along the record track, one of said transducers being adapted to generate a first electrical signal representing the mark-space code contained in each successive digital position, a second one of said pair of transducers being adapted to generate a second electrical signal similar to the first electrical signal but delayed in time by an interval equal to the time required for the pair of transducers to be swept along the record track a distance equal to the spacing between the transducers, a bistable circuit connected to the first of the transducers which is set to a condition corresponding to the mark-space code by the first electrical signal from the first transducer; a pulse separating circuit responsive to the condition of the bistable circuit and connected to the second one of the transducers to derive timing pulses from the second electrical signal corresponding to the transition occurring in each successive digital position, and means connected between the pulse separating circuit and the bistable circuit for generating an output signal having a binary value corresponding to the mark-space coding in the digital position adjacent the first transducer whenever a timing pulse appears.

10. An information record reading system including the combination of a record track having a plurality of digital positions in each of which a transition occurs in a mark-space code representing a binary digital value, a reading instrument having leading and lagging transducers spaced apart by a distance less than the distance occupied by a digital position in the record track, said reading instrument being adapted to be swept along the record track from digital position to digital position, said transducers being adapted to produce first and second electrical signals representing the mark-space code contained in each successive digital position with the second one of said electrical signals being delayed in time with respect to the first of the electrical signals by an interval equal to the time required for the reading instrument to be swept along the record track a distance equal to the spacing between the transducers, a pulse separating circuit responsive to the first electrical signal and connected to the second one of the transducers to derive timing pulses from the second electrical signal corresponding to the transition in each successive digital position, a bistable circuit connected to a first one of the transducers which is set to a condition corresponding to the mark-space code by the first electrical signal, and means connected between the pulse separating circuit and the bistable circuit for generating an output signal having a binary value corresponding to the mark-space coding in the digital position adjacent the first transducer whenever a timing pulse appears.

References Cited in the file of this patent

UNITED STATES PATENTS

| | | |
|---|---|---|
| 2,700,149 | Stone | Jan. 18, 1955 |
| 2,700,155 | Clayden | Jan. 18, 1955 |
| 2,729,809 | Hester | Jan. 3, 1956 |
| 2,730,699 | Gratian | Jan. 10, 1956 |
| 2,764,463 | Lubkin et al. | Sept. 25, 1956 |
| 2,780,670 | Brewster | Feb. 5, 1957 |
| 2,804,605 | De Turk | Aug. 27, 1957 |
| 2,851,676 | Woodcock et al. | Sept. 9, 1958 |
| 2,864,078 | Seader | Dec. 9, 1958 |

OTHER REFERENCES

"Techniques for Increasing Storage Density of Magnetic Drum Systems" (Fuller et al.), Proceedings of the Eastern Joint Computer Conference, December 8–10, 1954, pp. 16–21.